United States Patent Office 3,792,021
Patented Feb. 12, 1974

3,792,021
PROCESS FOR CROSSLINKING HYDROPHILIC COLLOIDS USING ACROLEIN DERIVATIVES SUBSTITUTED BY AN ONIUM GROUP
Paul Tschopp, Marly, Werner Deuschel, Villars sur Glane, Carlo Boragine, Fribourg, and Rainer Kitzing, Villars sur Glane, Switzerland, assignors to Ciba-Geigy AG, Basel, Switzerland
No Drawing. Filed July 7, 1971, Ser. No. 160,563
Claims priority, application Switzerland, July 7, 1970, 10,299/70
Int. Cl. C08f 3/34; C09h 7/00
U.S. Cl. 260—73 R    8 Claims

ABSTRACT OF THE DISCLOSURE

A process for crosslinking hydrophilic colloids containing amino, imino and/or hydroxyl groups by means of acrolein derivatives substituted by an onium group in the p-position as well as photographic material containing in at least one layer on a support a crosslinked hydrophilic colloid are described.

---

The subject of the invention is a process for cross-linking hydrophilic colloids which contain amino, imino and/or hydroxyl groups, characterized in that at least one compound of the formula (1)    $[A-CH=CH-E^\oplus]X^\ominus$ wherein A denotes an aldehyde group or functionally modified aldehyde group, $E^\oplus$ denotes an ammonium, phosphonium or sulphonium radical, and $X^\ominus$ denotes an anion, is used as the crosslinking agent.

The crosslinking agents of the Formula 1 are thus acroleins substituted by an onium group in the β-position, or functional aldehyde derivatives of such acroleins.

By functional derivatives, there are to be understood those reaction products of the aldehyde which are either capable of reacting as such with the hydrophilic colloid, to cause crosslinking, or in which the aldehyde is liberated in aqueous solution. Such functional derivatives are, for example, oximes, acylates, bisulphite adducts and above all azines, acetals, hydrates and azomethines. The manufacture and splitting of aldehyde derivatives is described in detail in "Houben-Weyl, Methoden der organischen Chemi, volume 7/1, page 413 to 487, 4th edition, 1954."

Amongst the functional aldehyde derivatives, the azomethines should be singled out, in that azomethine groupings have in general not been customary in crosslinking agents. These azomethines are obtained by reaction of the corresponding aldehyde with an amine. The reactivity of the aldehyde and of the amine from which the azomethine is formed is responsible for the crosslinking properties of the azomethine, since it is known that azomethines can react with compounds which possess primary amino groups, that is to say, for example, gelatine, to form a new azomethine. However, it is a prerequisite that the amine split off is less basic than the amine with which the azomethine is to react. In general, this reaction takes place the faster, the greater is the difference of the basicities of the amines involved.

Suitable azomethines for reaction with hydrophilic colloids, especially with those which contain free amino groups, are therefore above all those of which the amine component possesses a relatively weakly basic primary amino group, that is to say, for example, azomethines of aniline and of ring-substituted anilines. It has been found that azomethines of the aldehydes claimed, of which the amine component has a pK$_a$-value below 7, are particularly well able to react with a colloid containing free amino groups.

By the pK$_a$-value there is to be understood, in the present text, the negative logarithm of the acid constant of the amine, K$_a$, the acid constant, being obtained from the following formula:

$$K_a = \frac{[B][H^+]}{[BH^+]}$$  [B] = concentration
[H$^+$] = hydrogen ion concentraton
[BH$^+$] = concentration of the protonized base.

Preferred crosslinking agents to be used according to the invention accordingly correspond to the formula (2)    $[A_1-CH=CH-E^\oplus]X^\ominus$ wherein $A_1$ denotes an aldehyde group or an azomethine radical which is derived from an amine having a pK$_a$-value of below 7, and $E^\oplus$ and $X^\ominus$ have the indicated meaning.

The azomethine derivatives are thus compounds of the formula (2a)    $[R-N=CH-CH=CH-E^\oplus]X^\ominus$ wherein R represents the organic radical bonded to the amino group of the original amine and $E^\oplus$ and $X^\ominus$ have the indicated meaning. R—N= can here, for example, represent the radical of an aromatic, heterocyclic or aliphatic amine.

Compounds of particular interest as crosslinking agents are ammonium compounds of the formula (3)    $[A_1-CH=CH-E_1^\oplus]X^\ominus$ wherein $E_1^\oplus$ denotes an ammonium radical and $A_1$ and $X^\ominus$ have the indicated meaning.

Advantageous results are above all achieved when using compounds of the formula (4)    $[A_1-CH=CH-E_2^\oplus]X^\ominus$ wherein $E_2^\oplus$ represents an ammonium radical of which the quaternary nitrogen atom is substituted by aliphatic, cycloaliphatic, araliphatic or aromatic radicals and/or an amino or alkylamino group, or wherein the quanternary nitrogen atom belongs to an aliphatic or aromatic ring, and $X^\ominus$ and $A_1$ have the indicated meanings.

Amongst these compounds, those of the formula (5)    $[A_2-CH=CH-E_2^\oplus]X^\ominus$ wherein $A_2$ denotes an aldehyde group or an azomethine radical of the formula (5a)    $R_1-N=CH-$ wherein $R_1$ represents an optionally substituted aromatic-carbocyclic or aromatic-heterocyclic radical and $X^\ominus$ and $E_2^\oplus$ have the indicated meaning, are of particular interest.

$R_1$ can represent organic radicals which impart a pK$_a$-value of below 7 to the corresponding amine, and these radicals are preferably aromatic-carbocyclic or aromatic-heterocyclic. Optionally substituted benzene radicals are particularly suitable, and it is possible to influence the reactivity of the azomethine in the desired manner through the choice of the substituents. For example, substituents which lower the basicity of the aniline, such as halogen, for example fluorine, chlorine, bromine or iodine, and the nitro, alkylsulphonyl or nitrile group, yield very reactive azomethines. If a lower reactivity is desired, this can be achieved through the use of amine components which are more strongly basic, that is to say, for example, through anilines which are substituted by alkyl, such as methyl, alkoxy, such as methoxy, or aralkylamino, such as dimethylamino.

Preferred crosslinking agents correspond to the formula (6)    $[A_3-CH=CH-E_3^\oplus]X^\ominus$ wherein $A_3$ denotes an aldehyde group or an azomethine radical of the formula (6a)          $R_2-N=CH-$ wherein $R_2$ represents an optionally substituted benzene radical, $E_3^\oplus$ represents an ammonium radical of which the quaternary nitrogen atom is substituted by optionally substituted alkyl radicals which contain 1 to 18 carbon atoms, by a cycloaliphatic radical, containing 5 or 6 ring members, which optionally also contains hetero-atoms, such as N, O or S, or by an optionally substituted benzyl radical, or wherein the quaternary nitrogen atom belongs to a 5-membered or 6-membered aliphatic ring which optionally contains yet further hetero-atoms, such as N, O or S, or belongs to a 6-membered aromatic ring, and $X^\ominus$ has the indicated meaning.

The benzene radical $R_2$ can optionally be substituted for example by the following radicals: alkyl with 1 to 3 carbon atoms, especially methyl, halogen, especially chlorine, methylsulphonyl, nitro or nitrile.

Where the compounds of the Formulae 1 to 6 are azomethines, these are, for example, derived from the following amines:

| Amine: | pKa-values [1] |
|---|---|
| Aniline | 4.60 |
| 2-methyl-aniline | 4.39 |
| 3-methyl-aniline | 4.69 |
| 4-methyl-aniline | 5.10 |
| 3-chloro-aniline | 3.46 |
| 4-chloro-aniline | 3.98 |
| 4-dimethylamino-aniline | 6.59 |
| 3-methylsulphonyl-aniline | 2.58 |
| 3-nitro-aniline | 2.47 |
| 4-amino-benzonitrile | 1.74 |
| 2-amino-pyridine | 6.71 |
| 3-amino-pyridine | 6.03 |
| Amino-acetonitrile | 5.34 |
| 2,2,2-trifluoro-ethylamine | 5.7 |

[1] pKa=values measured at 25° C.

Where the quaternary nitrogen atom is substituted by alkyl radicals, these can, for example, be a longer-chain alkyl radical, such as octadecyl, dodecyl or octyl, and/or 1 to 3 lower alkyl radicals, such as n-butyl, ethyl or methyl. Possible substituents for such alkyl radicals are, for example, halogen, such as chlorine or bromine, alkoxy with 1 to 5 carbon atoms, hydroxyl, alkoxyalkoxy with twice 1 to 5 carbon atoms, carboxyalkyl or nitrile. Cycloaliphatic radicals as substituents on the quaternary nitrogen atom are, for example, the cyclohexyl or sulpholane radical. These cyclic radicals can also be substituted by lower alkyl radicals or by such radicals as have been indicated as substituents for the alkyl radicals. A benzyl radical as the substituent on the quaternary nitrogen atom can optionally also be substituted by the same radicals as have been indicated for alkyl, and additionally also by alkyl with 1 to 5 carbon atoms. Preferably, however, the radicals on the quaternary nitrogen atom are unsubstituted.

Where the quaternary nitrogen atom belongs, as a ring member, to a cycloaliphatic ring, this ring can possess yet a further, fused-on, cycloaliphatic ring. The nitrogen atom can thus be part of, for example, a morpholine, piperazine, pyrrolidine or quinuclidine radical, and such radicals can of course possess yet further substituents, such as have been indicated above for the benzyl radical. Where the quaternary nitrogen atom belongs to an aromatic ring, the radical is, for example, a pyridine or picoline radical, and such radicals can also possess substituents as previously indicated for the benzyl radical.

Because of their good reactivity, solubility and accessibility, the free aldehydes are in general preferred amongst the compounds to be used according to the invention, and amongst these, in particular, those of the formula (7) 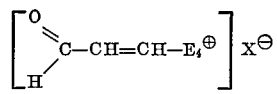

wherein $E_4^\oplus$ represents an ammonium radical of which the quaternary nitrogen atom is substituted by alkyl or cyanoalkyl, with the alkyl radical in each case containing 1 to 18, especially 1 to 8, carbon atoms, by a 6-membered cycloaliphatic radical or by a benzyl radical, or wherein the quaternary nitrogen atom belongs to a 5-membered or 6-membered aliphatic ring which optionally additionally contains nitrogen, oxygen or sulphur as further hetero-atoms, or belongs to a pyridine ring which is optionally substituted by halogen or alkyl with 1 to 5 carbon atoms, and $X^\ominus$ has the indicated meaning.

Preferably, the quaternary nitrogen atom has at most a single so-called higher-molecular substituent and two so-called low molecular substituents.

In general it is advantageous to choose the substituents on the quaternary nitrogen atom in such a way that the solubility is not reduced below a technically desirable value and that the molecular weight remains low. For this reason, lower alkyl radicals on the quaternary nitrogen atom, and radicals in which the quaternary nitrogen atom belongs to a 5-memebred or 6-membered, preferably unsubstituted, ring, are preferred.

The anion $X^\ominus$ in the Formulae 1 to 7 is appropriately a colorless acid anion. Where the cross linking agents are used for crosslinking hydrophilic colloids in photographic emulsions, it is naturally desirable that these anions should be photographically inert, that is to say they should not influence the solubility of the silver salts by precipitation or complex formation, and equally they should not influence the sensitivity and the gradation. Such anions are, for example, the nitrate, sulphate, perchlorate or fluoborate ion.

It is furthermore advantageous, for reasons of handling and storage, that the compounds should be non-hygroscopic or only slightly hygroscopic. For this reason anions which yield slightly hygroscopic or non-hygroscopic ammonium salts, such as, for example, the perchlorate or fluoborate anion, are preferred.

Accordingly, very suitable crosslinking agents are compounds of the formula (8) 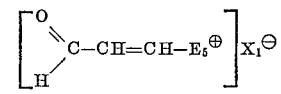

wherein $E_5^\oplus$ represents an ammonium radical of which the quaternary nitrogen atom is substituted by alkyl with 1 to 18, especially 1 to 4, carbon atoms, cyanoalkyl with 1 or 2 carbon atoms, cyclohexyl and/or benzyl, or belongs to a 5-membered or 6-membered aliphatic ring which optionally additionally contains oxygen or sulphur, or to a pyridine ring which is optionally substituted by halogen or by alkyl with 1 to 5 carbon atoms, and $X_1^\ominus$ denotes halide, perchlorate or fluoborate.

A particularly advantageous embodiment of the present invention is based on the use of crosslinking agents of the formula (9) 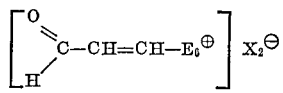

wherein $E_6^\oplus$ represents an ammonium radical of which the quaternary nitrogen atom is substituted by an alkyl radical with 1 to 18 carbon atoms, a cyanoethyl, cyclohexyl, phenyl, benzyl or β-phthalimidoethyl radical, and two methyl or ethyl radicals, or wherein the quaternary nitrogen atom belongs to a pyridine ring, a pyridine ring which is substituted by chlorine or methyl, or a N-methylpyrrolidine, N-methyl-morpholine, N-methyl-piperidine, 1-aza[2,2,2]-bicyclooctane or 1,1-dioxo-4-methyl-thiomorpholine ring, and $X_2^\ominus$ denotes perchlorate or fluoborate.

In addition to the preferred ammonium compounds, the corresponding phosphonium or sulphonium compounds can also be used according to the invention.

The ammonium compounds to be used according to the invention, or their radical $E^\oplus$ and $E_1^\oplus$ to $E_6^\oplus$, can, for example, be derived from the following tertiary amines:

trimethylamine,
triethylamine,
N-methyl-N,N-diethylamine,
diethyl-ethanolamine,
3-dimethylamino-propionitrile,
N,N-dimethyl-1-butylamine,
N,N-dimethyl-1-octylamine,
N,N-dimethyl-1-dodecylamine,
N,N-dimethyl-cyclohexylamine,
N-methyl-pyrrolidine,
N-methyl-piperazine,
N-methylmorpholine,
N-ethyl-morpholine,
3-N,N-dimethylamino-sulpholane,
1-aza-(2,2,2)-bicyclooctane,
N,N-dimethyl-piperazine,
pyridine,
3-chloro-pyridine,
4-chloro-pyridine,
2-picoline,
3-picoline,
4-picoline and
N,N-dimethyl-benzylamine.

To illustrate the onium compounds which can be used according to the invention, the formulae of, for example, the compounds given below are presented in detail in Tables I and II:

TABLE I

| Formula number | $E^\oplus$ in Formula (12) $\left[\begin{array}{c}O\\ \parallel\\ H\end{array}C-CH=CH-E^\oplus\right] X^\ominus$ | |
|---|---|---|
| 101 | $(H_5C_2-)_3\overset{\oplus}{N}-$ | $X = ClO_4^-$ |
| 102 | $H_3C-(CH_2)_3-\overset{\oplus}{N}(-CH_3)_2$ | $ClO_4^-$ |
| 103 | $H_3C-(CH_2)_6-\overset{\oplus}{N}(-CH_3)_2$ | $ClO_4^-$ |
| 104 | $H_3C-(CH_2)_{11}-\overset{\oplus}{N}(-CH_3)_2$ | $ClO_4^-$ |
| 105 | $H_3C-(CH_2)_{17}-\overset{\oplus}{N}(-CH_3)_2$ | $Cl^-$ |
| 106 | $NC-(CH_2)_2-\overset{\oplus}{N}(-CH_3)_2$ | $ClO_4^-$ |
| 107 | cyclohexyl-$\overset{\oplus}{N}(-CH_3)_2$ | $ClO_4^-$ |
| 108 | phenyl-$CH_2-\overset{\oplus}{N}(-CH_3)_2$ | $ClO_4^-$ |
| 109 | pyrrolidinyl-$CH_3$ | $ClO_4^-$ |
| 110 | morpholinyl-$CH_3$ | $ClO_4^-$ |
| 111 | piperidinyl-$CH_3$ | $ClO_4^-$ |

TABLE I—Continued

| Formula number | $E^\oplus$ in Formula (12) $\left[\begin{array}{c}O\\ \parallel\\ H\end{array}C-CH=CH-E^\oplus\right] X^\ominus$ | |
|---|---|---|
| 112 | pyridinium | $ClO_4^-$ |
| 113 | 4-chloro-pyridinium | $ClO_4^-$ |
| 114 | 4-methyl-pyridinium | $ClO_4^-$ |
| 115 | pyridinium | $ClO_4$ |
| 116 | phenyl-$\overset{\oplus}{N}-(CH_3)_2$ | $ClO_4$ |
| 117 | 1,1-dimethyl-sulpholanium ($O_2S$ ring, $\overset{\oplus}{N}(CH_3)_2$) | $ClO_4$ |
| 118 | phthalimido-$CH_2-CH_2-\overset{\oplus}{N}(CH_3)_3$ | $BF_4^-$ |
| 119 | $(C_2H_5)_3-N^\oplus-$ | $BF_4^-$ |
| 120 | $(C_2H_5)_3-N^\oplus-$ | $Cl^-$ |
| 121 | $(C_2H_5)_3-N^\oplus-$ | $Br^-$ |
| 122 | $(C_2H_5)_3-N^\oplus-$ | $I^-$ |

TABLE II

| Formula No. | A in the Formula (13) $\left[A-CH=CH-\overset{+}{N}(-C_2H_5)_3\right] X^-$ | |
|---|---|---|
| 201 | phenyl-$N=CH-$ | $X = ClO_4^-$ |
| 202 | 4-chloro-phenyl-$N=CH-$ | $ClO_4^-$ |
| 203 | $H_3C-$phenyl-$N=CH-$ | $ClO_6^-$ |
| 204 | $(H_3C)_2N-$phenyl-$N=CH-$ | $ClO_4^-$ |
| 205 | 4-nitro-phenyl-$N=CH-$ ($O_2N$) | $ClO_4^-$ |
| 206 | $-\overset{H}{\underset{\phantom{.}}{C}}=N-N=\overset{H}{\underset{\phantom{.}}{C}}-$ | $2\cdot BF_4^-$ |
| 207 | $H-\overset{OH}{\underset{OH}{C}}-$ | $BF_4^{-1}$ |
| 208 | $H-\overset{OCH_3}{\underset{OH}{C}}-$ | $ClO_4^-$ |

[1] 119 according to the NMR spectrum, is present in dilute aqueous solution as the hydrate 207. Ratio approximately 1 : 1.

The onium compounds to be used according to the invention are in part known, and can be manufactured according to methods which are in themselves known. The aldehydes, especially of the ammonium compounds of the Formula 1, can, for example, be manufactured by reacting a compound of the formula

(14) 

with a compound of the formula

(15) 

If desired, the anion can subsequently still be replaced, for example replacing $Cl^\ominus$ by $ClO_4^\ominus$, whereby compounds which crystallize better and are less hygroscopic can be obtained. Such processes are, for example, described in: Z. Chem. 8, 269, (1968) or Chem. Ber. 102, 2609, (1969). In general, mixtures of cis- and trans-compounds are thereby obtained.

The conversion of the aldehydes into functional derivatives is carried out as indicated initially. Thus, for example, the azomethines are obtained by reaction of the aldehyde with an appropriate amine at a suitable temperature.

The aldehydes, and also the azomethines, were preferably manufactured in absolute ethanol, acetone or acetonitrile.

The agents defined according to the invention can be used in the textile and leather industry, the manufacture of paper, and the plastics, glue and gelatine industry. They are above all used as hardeners for water-soluble polymers, such as polyvinyl alcohol, gelatine or gelatine derivatives, especially in the form of layers of photographic materials which contain such colloids. The reaction of the gelatine with these compounds in general takes place easily and in the usual manner. The compounds are as a rule sufficiently soluble in water or in water-miscible, photographically inactive, organic solvents, such as acetone, methanol, ethanol or dimethylformamide or in their mixtures, including the mixtures with water. Thus, for example, it is important that these compounds should still be so easily dispersible in 0.1 to 10% strength aqueous gelatine solutions that they do not precipitate in a crystalline form.

In most cases it suffices to add the products to be used according to the invention as an aqueous solution, or in a solid form which is as finely divided as possible, to an aqueous solution of the hydrophilic colloid, whilst stirring well. It is, however, also possible to employ the customary distribution methods, by means of kneading and/or shear forces or ultrasonics, for this purpose.

It is thus, for example, possible to bring a solution of the hardener in water, ethanol or methanol together with gelatine at normal or slightly elevated temperature, and to cast the gelatine, optionally containing silver halide and/or other materials for producing photographic images, onto a substrate, in the usual manner, to give a layer, and to dry this if desired. The layer can then be left alone at elevated temperature for a certain period, for example up to 18 hours, or at room temperature. Hereupon, hardening takes place rapidly and to an increasing extent; the melting point of the gelatine is significantly raised, for example by 25 to 60° C., and the swelling factor is correspondingly lowered.

The amount of hardener used depends on the desired degree of hardening, but is appropriately 0.1 to 10% by weight, relative to the weight of dry gelatine.

A particular advantage of the present crosslinking agents is that when used in low concentration, for example 0.25 to 1%, they already harden the gelatine layer to a sufficient degree rapidly, for example after 18 to 24 hours, so that an examination of the cast material by processing samples can be carried out immediately after the manufacturing process, even at elevated temperature or in chemically aggressive processing baths.

It is furthermore advantageous that in the hardening process according to the invention, using the compounds of the Formula 1 no pH change in the emulsion layer occurs. The hardened product itself is very stable, and even after prolonged storage at temperatures of around 40° C. and at a relative atmospheric humidity of about 70%, the melting point of a hardened gelatine remains above 90° C. The degree of hardening is also not significantly changed by bases or especially by acids, even on prolonged exposure, and this indicates high resistance to hydrolysis of the hardener-gelatine bond. Thus the crosslinking agents claimed here are also very suitable for combination with other crosslinking agents which, for example, develop their full hardening action particularly effectively in a higher pH range, such as between 8 and 14.

The compounds of the Formula 1 are additionally generally very soluble in water and are very stable in aqueous solution, above all in approximately neutral aqueous solution. The photographic properties are in general only insignificantly affected by the crosslinking with the compounds of the Formula 1.

The hardeners are suitable for hardening (crosslinking) the most diverse layers containing gelatine, such as, for example, intermediate layers, emulsion layers, base layers, coating layers, backing layers and anti-halo layers. The layers can contain only the crosslinking agents, or can also contain additives of the most diverse kind, such as, for example, silver halide, pigments, such as barium sulphate, titanium dioxide, silicon dioxide or pigments of organic nature, such as pigment dyestuffs, as well as image dyestuffs, color-coupling agents, sensitizers, filter dyestuffs, anti-halo dyestuffs and screening dyestuffs, stabilizers, UV-absorbers, optical brighteners or other crosslinking agents.

In the case of the compounds of relatively low molecular weight it is possible, as a result of good diffusibility, to add them to only one layer in a multi-layer material, for example to add them to an auxiliary layer in order to achieve hardening of the adjacent silver halide layers through diffusion. With increasing molecular weight, however, comparable compounds show decreasing diffusion when used in photographic layers. When manufacturing multi-layer materials, this property offers decisive advantages in several respects.

These new crosslinking agents can also be used mixed with other compounds suitable for crosslinking water-soluble colloids, especially gelatine.

In the examples which follow, percentages are percentages by weight.

EXAMPLE 1

6 ml. of a 6% strength aqueous gelatine solution are mixed with 0.29 to 2.0 ml. of a 1% strength aqueous solution of a compound of the Formula 101 and made up to 10 ml. with distilled water, and the mixture is then cast on a substrated glass plate of size 13 cm. × 18 cm. After a period of storage of 24 hours at 20° C. and 50 to 55% relative atmospheric humidity (normal storage) the melting points are determined by dipping into a stirred waterbath which is being heated to the boil at a speed of about 2.5° C./minute. The temperature at which the layer detaches from the substrate and dissolves is taken as the melting point. The results of such a test series are given in Table III and IV.

TABLE III

| Hardener solution, ml. | Grams of hardener/ 100 g. of gelatine | Melting point in ° C. after 24 hours |
| --- | --- | --- |
| 2.0 | 5.56 | >95 |
| 1.0 | 2.78 | >95 |
| 0.65 | 1.80 | >95 |
| 0.5 | 1.39 | >95 |
| 0.29 | 0.81 | >95 |

TABLE IV

| Compound No. | Concentration, grams of hardener/100 g. of gelatine | Melting point in °C. | |
|---|---|---|---|
| | | 24 hours, normal storage, 20°C., 50-55 RH[1] | 43°C./69% RH[1] |
| 101 | 1.4 | >95 | |
| 102 | 1.4 | >95 | |
| 103 | 1.4 | >95 | |
| 104 | 2.8 | 70-76 | |
| 105 | 5.6 | 56 | |
| 106 | 1.0 | 67-73 | |
| 107 | 1.0 | >95 | |
| 108 | 1.0 | >95 | |
| 109 | 1.0 | >95 | |
| 110 | 1.4 | >95 | |
| 111 | 1.0 | >95 | |
| 112 | 1.0 | >95 | |
| 113 | 1.4 | 59 | |
| 114 | 1.0 | >95 | |
| 115 | 2.0 | >95 | |
| 116 | 0.55 | 88 | |
| 117 | 2.75 | >95 | |
| 118 | 2.75 | >95 | |
| 119 | 2.75 | >95 | |
| 120 | 1.1 | >95 | |
| 121 | 1.1 | 90-93 | |
| 122 | 1.1 | 89-92 | |
| 201 | 1.4 | 89 | >95 (4 hours). |
| 202 | 2.1 | >95 | |
| 203 | 1.4 | 80-91 | >95 (4 hours). |
| 204 | 2.8 | | >95 (4 hours). |
| 205 | 2.1 | >95 | |
| 206 | 5.0 | | >95 (24 hours). |
| 207 | 2.75 | >95 | |
| 208 | 0.55 | >95 | |

[1] RH = Relative atmospheric humidity.

EXAMPLE 2

6 ml. of a 6% strength gelatine solution are mixed with 2 ml. of a 1% strength aqueous solution of the hardener of the Formula 101 and 2 ml. of water, in the sequence indicated, and the mixture is adjusted to a PH-value of between 4.0 and 7.0 by means of citric acid or 2 N sodium hydroxide solution. After 24 hours' storage at 20° C. and 50 to 55% relative atmospheric humidity, the melting points are determined as described in Example 1.

In the pH range of 4.0 to 7.0, all melting points are above 95° C.

EXAMPLE 3

6 ml. portions of 6% strength gelatine solution are mixed with 0.5 ml. of the hardener solution from Example 1 and 0.03 ml. to 1.25 ml. of an 8% strength solution of an anionic detergent, for example the Na salt of diisobutylnaphthalenesulphonic acid, and made up to 10 ml. with distilled water. The mixture is cast onto a substrated glass plate of size 13 cm. x 18 cm. After 24 hours' storage at 20° C. and 50 to 55% relative atmospheric humidity, the melting points are determined as described in Example 1.

All melting points are above 95° C.

EXAMPLE 4

The compound of the Formula 101 is incorporated, in the form of a 1% strength aqueous solution, into a photographic silver bromide-iodide emulsion, and this is cast on a substrated triacetate support in such a way that the surface concentrations are 1.8 g. of silver/m.$^2$ and 2.4 g. of gelatine/m.$^2$.

The sensitometric data are determined according to customary methods, immediately after casting and after 7 days ageing at 43° C. and 69% relative atmospheric humidity. In general, 6 hours under these conditions correspond to one week's storage time under normal conditions (20° C., 50 to 55% relative atmospheric humidity). The results of such a test series are summarized in Table V.

TABLE V

| Grams of hardener/ 100 g. of gelatine | Relative sensitivity, log E | | Gamma | | Minimum density .100 (fogging) | |
|---|---|---|---|---|---|---|
| | Immediately | After 1 week | Immediately | After 1 week | Immediately | After 1 week |
| Without hardener | 1.62 | 1.53 | 0.95 | 0.90 | 3 | 5 |
| 0.4 | 1.70 | 1.74 | 0.80 | 0.65 | 3 | 3 |
| 0.8 | 1.75 | 1.77 | 0.75 | 0.60 | 3 | 3 |
| 1.2 | 1.80 | 1.80 | 0.75 | 0.60 | 3 | 3 |
| 1.6 | 1.85 | 1.81 | 0.65 | 0.60 | 3 | 3 |

The same emulsions are again cast after having been left for 5 hours at 36° C. During this time, no change in the pH-value, and at most a 5% change in viscosity, are observable. The sensitometric examination of this second casting series shows no noticeable differences compared to the first casting series.

The examination of hardening, by means of melting points, is carried out at various pH-values and under various storage conditions. Table VI gives the melting points of the first casting series. The second casting series shows melting points which are at most 3° C. lower.

TABLE VI

| Grams, of hardener/ 100 g. of gelatine | Melting points in ° C. in an aqueous solution | | | | | |
|---|---|---|---|---|---|---|
| | At pH 1 | | At pH 7 | | At pH 12 | |
| | Storage time at 43°C. and RH[1] 69% | | Storage time at 43° C. and 69% RH | | Storage time at 43° C. and 69% RH | |
| | 6 hours | 3 weeks | 6 hours | 3 weeks | 6 hours | 3 weeks |
| 0 | 32 | 34 | 33 | 37 | 33 | 36 |
| 0.4 | 84 | 90 | >90 | >90 | 61 | 80 |
| 0.8 | >90 | >90 | >90 | >90 | 76 | 87 |
| 1.2 | >90 | >90 | >90 | >90 | 82 | 90 |
| 1.6 | >90 | >90 | >90 | >90 | 86 | >90 |

[1] RH = Relative atmospheric humidity.

EXAMPLE 5

The amounts indicated in Table VII of a 1% strength aqueous solution of the hardener of the Formula 101 are added to 10 g. portions of a 6% strength aqueous polyvinyl alcohol solution, which are made up to a total weight of 15 g. with distilled water. These mixtures are cast as described in Example 1 and the melting points are determined after a storage time of 96 hours at 20° C. and 50 to 55% relative atmospheric humidity.

The results of such a test series are summarized in Table VII.

TABLE VII

| Hardener solution, ml. | Grams of hardener/ 100 g. of polyvinyl alcohol | Melting point in ° C. after 96 hours, in water |
|---|---|---|
| 0 | 0 | 25-45 |
| 3.0 | 5.0 | 71 |
| 1.2 | 2.0 | 71 |
| 0.6 | 1.0 | 70 |

EXAMPLE 6

The amounts indicated in Table VIII of a 1% strength solution of the hardener of the Formula 201, in 4:1 water/ethanol, are added to 6 ml. portions of a 6% strength gelatine solution. The resulting mixtures are diluted with water to 10 ml. each and are cast as described in Example 1. After storage for 24 hours at 20° C. and 50 to 55% relative atmospheric humidity, or 4 hours at 43° C. and 69% relative atmospheric humidity, the melting points are determined as described in Example 1. The results of such a test series are summarized in Table VIII.

TABLE VIII

| Hardener solution ml. | Grams of hardener/ 100 g. of gelatine | Melting points in water | |
|---|---|---|---|
| | | 24 hours at 20° C., 50 to 55% RH | 4 hours at 43° C., and 69% RH |
| 2.0 | 5.5 | >95 | >95 |
| 1.0 | 2.8 | >95 | >95 |
| 0.5 | 1.4 | 89 | >95 |

EXAMPLE 7

A solution, adjusted to a pH-value of 6, of 0.386 millimol of the hardener of the Formula 119 in 50 ml. of distilled water, is added to 100 ml. of a 6% strength gelatine solution of pH-value 6. After mixing, 10 ml. of the mixture are cast on a triacetate substrate of 13 cm. x 18 cm. and dried for 2½ hours at 21° C. and 43% relative atmospheric humidity.

The samples manufactured in this way are stored for 21 days under the same conditions and on various days the swelling factor of one sample at a time is determined under the microscope. The results are summarized in Table IX.

TABLE IX

Hardener: (119)

| Storage time | 21° C., 43% RH, swelling factor |
|---|---|
| 0 hr | 9.2 |
| 1 day | 5.0 |
| 2 days | 4.4 |
| 4 days | 3.7 |
| 7 days | 3.8 |
| 21 days | 3.6 |

EXAMPLE 8

30 ml. of an 0.33 millimol solution of the hardener of the Formula 115 or 119, of pH 6, are added to 40.5 ml. of a 6% strength gelatine solution of pH-value 6. After mixing, 5 ml. of the mixture are cast on several glass plates of size 13 x 18 cm. and dried for 2½ hours at 23° C. and 55% relative atmospheric humidity. Thereafter, the samples are stored for several days, either under normal climatic conditions (21° C., 50% relative atmospheric humidity) or in a climatically controlled cabinet (43° C., 69% relative atmospheric humidity), and the hardening is determined by the Indentor method.

For the measurement, the samples are allowed to swell for 20 minutes in distilled water at 25° C., and are then moved linearly, in the same medium, in an Indentor apparatus under increasing weight. In doing so, the Indentor penetrates into the layer from a certain load onwards, and causes scratch marks. The load given at the start of the scratch marks is a measure of the magnitude of the modulus of elasticity, the plastic deformation and the swelling of the gelatine sample. Higher loads correspond to an increasing degree of crosslinking. Table X below indicates the increase in the degree of cross-linking in relation to the applied Indentor weight.

TABLE X

| | Hardener: (115) | | Hardener: (119) | |
|---|---|---|---|---|
| Storage time | 21° C., 50% RH, indentor weight, g. | 43° C., 69% RH, indentor weight g. | 21° C., 50% RH, indentor weight, g. | 43° C., 69% RH, indentor weight, g. |
| 3 hrs | 70 | 270 | 70 | 235 |
| 12 hrs | 110 | 330 | 145 | 255 |
| 1 day | 130 | 360 | 175 | 270 |
| 2 days | 150 | 400 | 220 | 285 |
| 4 days | 165 | 430 | 260 | 305 |
| 8 days | 175 | 445 | 310 | 325 |
| 16 days | 190 | 455 | 345 | 350 |
| 32 days | 215 | 485 | 350 | 355 |

EXAMPLE 9

A silver bromide-iodide emulsion containing 30 g. of silver and 80 g. of gelatine per 1000 g. of emulsion is sensitized spectrally with 180 mg. of the sensitizer of the Formula M per mol of silver.

(M)
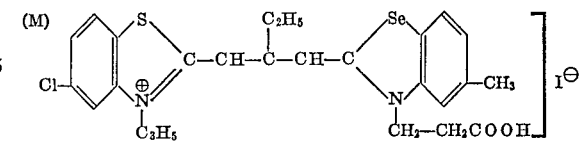

Apart from the customary additives, such as stabilizer, wetting agent and plasticizer, 7 g. of the blue-green image dyestuff of the formula (N)
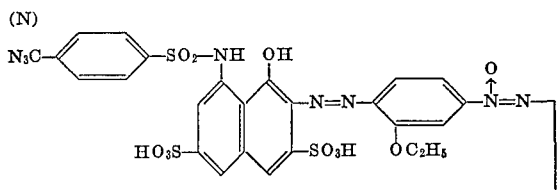

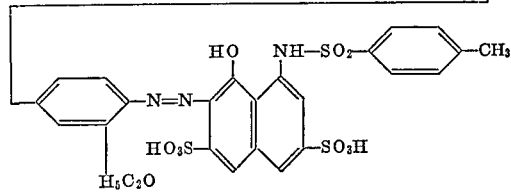

are added per 1000 g. of emulsion.

The sensitizer of the Formula M shows a sensitization maximum at 660 nm. The image dyestuff of the Formula N shows an absorption maximum at 650 nm. 2.5 g. of the hardener of the Formula 119 per 100 g. of gelatine are further added to one half, A, of this casting solution. The half B remains without hardener, for comparison purposes. The two parts A and B are cast onto a transparent film substrate, the amount of silver applied being 1.7 g./m.².

The cast products A and B are exposed to light from above, behind a gray wedge, using a red filter, and are processed in accordance with the following instructions:

6 minutes' "developer":   G.
   p-Methylaminophenol sulphate _____ 2
   Anhydrous sodium sulphate _____ 50
   Hydroquinone _____ 6
   Anhydrous sodium carbonate _____ 20
   Potassium bromide _____ 2
   Water to make up to 1000 ml.
2 minutes' "stop-fixing bath":   G.
   Crystalline sodium thiosulphate _____ 200
   Anhydrous sodium sulphite _____ 15
   Sodium acetate (3H₂O) _____ 25
   Glacial acetic acid 13 ml.
   Water to make up to 1000 ml.
4 minutes' soaking.
20 minutes' "dye-bleach bath":
   Water _____ml__ 500
   Sulphuric acid (96% strength) _____ml__ 14
   Crystalline sodium hypophosphite _____g__ 1
   Potassium iodide _____g__ 20
   6-benzoylamino-2,3-dimethylquinoxaline
   _____mg__ 30
   Water to make up to _____ml__ 1000
2 minutes' soaking.
6 minutes' "silver bleach bath":
   Water _____ml__ 500
   Sulphuric acid (96% strength) _____ml__ 27
   Crystalline copper sulphate _____g__ 20
   Potassium bromide _____g__ 60
   Water to make up to _____ml__ 1000
2 minutes' soaking.
4 minutes' "fixing bath":
   Composition as for stop-fixing bath
8 minutes' soaking.

The gelatine layer of the cast product B detaches from the substrate during processing. The cast product A yields resistant color wedges paralled to the original.

15μ thin sections of the cast products A and B are cut off by means of a microtome. The gelatine thicknesses of the thin sections are measured under a microscope, firstly dry and then after addition of water. The results of these measurements, and the swelling factors computed, are given in Table XI below:

TABLE XI

| Cast product | Dry thickness in μ | Swollen thickness in μ | Swelling factor |
|---|---|---|---|
| A | 5 | 15 | 3 |
| B | 5 | 43 | 8,6 |

The swelling factor of the hardened cast product A is considerably less than that of the unhardened cast product B.

EXAMPLE 10

A silver bromide-iodide emulsion containing 30 g. of silver and 80 g. of gelatine per 1000 g. of emulsion is treated with the customary additives, such as stabilizers, wetting agents and plasticizers, and with 12 g. of an emulsion of the yellow image dyestuff of the Formula Q per 1000 g.

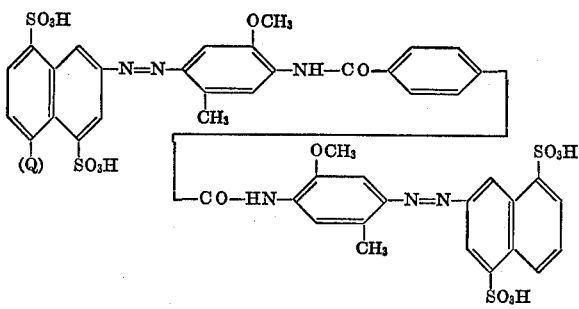

This image dyestuff shows an absorption maximum at 416 nm.

Additionally, 3.5 g. of the hardener of the Formula 119 per 100 g. of gelatine are added to one-half, A, of this casting solution. The half B is left without hardener, for comparison purposes.

The two parts A and B are cast, exposed and developed as in Example 9.

During processing, the gelatine layer of the cast product B detaches from the substrate. The cast product A yields resistant color wedges paralled to the original. The gelatine thicknesses of the cast products A and B are measured under a microscope, as described in Example 9. The results of these measurements are given in Table XII below:

TABLE XII

| Cast product | Dry thickness in μ | Swollen thickness in μ | Swelling factor |
|---|---|---|---|
| A | 6 | 20 | 3 |
| B | 8 | 87 | 10,9 |

The swelling factor of the hardened cast product A is considerably lower than that of the unhardened cast product B.

What is claimed is:

1. Process for crosslinking hydrophilic colloids which contain amino, imino and/or hydroxyl groups, which comprises using at least one compound of the formula (1)      $[A—CH=CH—E^{\oplus}]X^{\ominus}$ wherein $A_1$ denotes an aldehyde group or an azomethine radical which is derived from an amine which has a $pK_a$ value of less than 7 $E^{\oplus}$ denotes an ammonium radical and $X^{\ominus}$ denotes an anion, crosslinking agent.

2. Process according to claim 1, which comprises using at least one compound of the formula (4)      $[A_1—CH=CH—E_2^{\oplus}]X^{\ominus}$ wherein $E_2^{\oplus}$ represents an ammonium radical of which the quaternary nitrogen atom is substituted by aliphatic, cycloaliphatic, araliphatic or aromatic radicals and/or an amino or alkylamino group, or wherein the quaternary nitrogen atom belongs to an aliphatic or aromatic ring, and $X^{\ominus}$ and $A_1$ have the meanings indicated in claim 3, as crosslinking agent.

3. Process according to claim 2, which comprises using at least one compound of the formula (5)      $[A_2—CH=CH—E_2^{\oplus}]X^{\ominus}$ wherein $A_2$ denotes an aldehyde group or an azomethine radical of the formula $$R_1—N=CH—$$

wherein $R_1$ represents an unsubstituted or substituted aromatic-carbocyclic or aromatic-heterocyclic radical and $X^{\ominus}$ and $E_2^{\oplus}$ have the meaning indicated in claim 2, as crosslinking agent.

4. Process according to claim 3, which comprises using at least one compound of the formula (6)      $[A_3—CH=CH—E_3^{\oplus}]X^{\ominus}$ $$\left[A_3-CH=CH-E_3^{\oplus}\right]X^{\ominus}$$

wherein $A_3$ denotes an aldehyde group or an azomethine radical of the formula $$R_2—N=CH—$$

wherein $R_2$ represents an unsubstituted or substituted benzene radical, $E_3^{\oplus}$ represents and ammonium radical of which the quaternary nitrogen atom is substituted by unsubstituted or substituted alkyl radicals which contain 1 to 18 carbon atoms, by a cycloaliphatic radical containing 5 or 6 ring members, which may also contain hetero-atoms, or by an unsubstituted or substituted benzyl radical, or wherein the quaternary nitrogen atom belongs to a 5-membered or 6-membered aliphatic ring which may contain yet further hetero-atoms, or belongs to a 6-membered aromatic ring, and $X^{\ominus}$ has the meaning indicated in claim 5, as crosslinking agent.

5. Process accordinng to claim 1, which comprises using at least one compound of the formula (7)
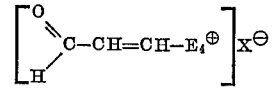

wherein $E_4^{\oplus}$ represents an ammonium radical of which the quaternary nitrogen atom is substituted by alkyl or cyanoalkyl, with the alkyl radical in each case containing 1 to 18 carbon atoms, by a 6-membered cycloaliphatic radical or by a benzyl radical, or wherein the quaternary nitrogen atom belongs to a 5-membered or 6-membered aliphatic ring which may additionally contain nitrogen, oxygen or sulphur as further hetero-atoms, or belongs to a pyridine ring which is unsubstituted or substituted by halogen or alkyl with 1 to 5 carbon atoms, and $X^{\ominus}$ has the meaning indicated in claim 1, as crosslinking agent.

6. Process according to claim 1, which comprises using at least one compound of the formula (8)
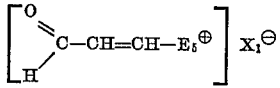

wherein $E_5^+$ represents an ammonium radical of which the quaternary nitrogen atom is substituted by alkyl with 1 to 18 carbon atoms, cyanoalkyl with 1 to 2 carbon atoms, cyclohexyl and/or benzyl, or belongs to a 5-membered or 6-membered aliphatic ring which may additionally contain oxygen or sulphur, or to a pyridine ring which is unsubstituted or substituted by halogen or alkyl with 1 to 5 carbon atoms, and $X_1^\ominus$ denotes halide, perchlorate or fluoborate, as crosslinking agent.

7. Process according to claim 1, which comprises using at least one compound of the formula (9) 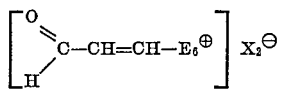

wherein $E_6^\oplus$ represents an ammonium radical of which the quaternary nitrogen atom is substituted by an alkyl radical with 1 to 18 carbon atoms, a cyanoethyl, cyclohexyl, phenyl, benzyl or β-phthalimidoethyl radical, and two methyl or ethyl radicals, or wherein the quaternary nitrogen atom belongs to a pyridine ring, a pyridine ring which is substituted by chlorine or methyl, a N-methyl - pyrrolidine, N - methyl-morpholine, N-methyl-piperidine, 1 - aza[2,2,2]-bicyclooctane or 1,1-dioxo-4-methyl-thiomorpholine ring, and $X_2^\ominus$ denotes perchlorate or fluoborate, as crosslinking agent.

8. Process according to claim 1, which comprises crosslinking polyvinyl alcohol or gelatine.

References Cited
UNITED STATES PATENTS

| | | | |
|---|---|---|---|
| 2,227,982 | 1/1941 | Sheppard et al. | 260—117 X |
| 3,480,440 | 11/1969 | Himmelmann et al. | 260—117 X |
| 3,446,768 | 5/1969 | Ehmann | 260—875 X |

HOWARD E. SCHAIN, Primary Examiner

U.S. Cl. X.R.

96—111; 260—91.3 VA, 117

UNITED STATES PATENT OFFICE
CERTIFICATE OF CORRECTION

Patent No. 3,792,021  Dated February 12, 1974

Inventor(s) Tschlopp et al.

It is certified that error appears in the above-identified patent and that said Letters Patent are hereby corrected as shown below:

Claim 4, Column 14, line 28, delete

" $[A_3-CH=CH-E_3\oplus] \; X^\ominus$ ".

Signed and sealed this 8th day of October 1974.

(SEAL)
Attest:

McCOY M. GIBSON JR.
Attesting Officer

C. MARSHALL DANN
Commissioner of Patents